UNITED STATES PATENT OFFICE.

CARL SCHINDLER, OF BERLIN-SCHÖNEBERG, GERMANY.

HIGH-PER-CENT. SALVARSAN EMULSION.

1,051,520.  Specification of Letters Patent.  Patented Jan. 28, 1913.

No Drawing.  Application filed July 5, 1911. Serial No. 636,922.

*To all whom it may concern:*

Be it known that I, CARL SCHINDLER, a subject of the German Emperor, and residing at Berlin-Schöneberg, Germany, have invented certain new and useful Improvements in High-Per-Cent. Salvarsan Emulsions, of which the following is a specification.

The present invention has reference to an improved process of preparing high-per-cent. sterile oil emulsions of organic arsenical compounds, and relates more especially to the preparation of an oil emulsion of the dioxydiaminoarsenobenzene, termed "salvarsan"; and the object of the invention is to do away with the many objections attaching to the preparation, use and effects of the arsenic compounds now used in combatting infectious diseases, mainly syphilis.

Salvarsan as such and the mode of its application and its after-effects show several well known disadvantages. Since it is highly oxidizable it must be kept in evacuated containers. For the same reason the aqueous solutions, in which it is now administered, must always be freshly prepared, since they do not keep for any length of time. The concentration, in which these aqueous solutions are used, necessarily is relatively low, so that large volumes must be injected in order to introduce the required amount of active substance. Owing to the irritating properties of the substance the injection causes great, often excruciating pain. To meet these objections, it has been proposed to employ an oily suspension obtained by means of paraffin oil. However, the results were in no wise satisfactory. Paraffin oil is capable of incorporating but relatively small quantities of the powder and the obtained suspension does not keep well, the suspended salvarsan soon dropping to the bottom again. Furthermore, to prevent stopping-up of the syringe owing to the uneven distribution of the solid constituent, larger cannulas must be chosen than are now used, for instance, for injecting mercury. And again, since such preparations are generally used in a ten-per cent. solution, each full injection, containing the usual amount of salvarsan=0.6 gram, would amount to 6 cubic-centimeters of liquid. And lastly, when we consider that paraffin always remains a foreign body which will not be reabsorbed in the organism and can be determined in the body after 15 years and more, and that it causes great pain and occasions infiltrations, it would appear that paraffin is a very unsuitable medium for such injections.

According to the present invention I obtain high-per-cent. sterile oil emulsions of salvarsan and similar organic arsenical compounds which show none of the above described objections.

The invention essentially consists in employing for the emulsification of the salvarsan sesame oil and especially iodic sesame oil. It seems that sesame oil has a pronounced affinity to salvarsan. Thus, sesame oil has the capability of readily taking-up the active substance in large quantities, so that for suspending 0.6 gram of salvarsan only 3–3½ cubic centimeters of oil are required. The oil very quickly incorporates the salvarsan and suspends it so well that only after a considerable period of time does it drop to the bottom. The pure sesame oil-salvarsan suspension, however, has not been found to answer the purpose, for the reason that the oil as such is not sterile and first must be sterilized, and then because the oil in the open market is not of absolutely uniform, reliable quality, so that its nature and properties must always first be determined. I now have discovered that all these objections can be overcome by employing in place of the pure sesame oil the iodized sesame oil, known as "iodipin". This body appears to be preëminently appropriate for the incorporation of salvarsan, of which 50–60% are taken up by the oil without laborious trituration. At the same time the emulsion is so complete that even after weeks and months no appreciable sediment will show. Yet in spite of this high percentage of salvarsan the preparation on slight heating becomes so liquid that it can readily be injected through fine syringes. A moderate addition of a solid fatty substance, such as lanolin, suffices to congeal the preparation for shipment and storage purposes. Iodipin, moreover, has the advantage of being itself a bactericide, and it transmits this property to the salvarsan emulsion, so that the preparation need not be specially sterilized.

The technical advantages of my new preparation thus are the following:—(1) An extraordinary high percentage of salvarsan can be incorporated and be held in finest homogeneous emulsion, without a deposit being formed even after standing a considerable length of time. (2) The active substance is incorporated very quickly without tedious trituration. (3) Absolute sterility. (4) Sufficient liquidity to pass through the finest syringe needles. (5) Congealment at ordinary temperature after admixture of inconsiderable amounts of a solid fatty substance, and consequent economy, since during shipment and storage nothing runs along the glass and adheres thereto and the contents can be extracted to the very last; a matter of importance when the high price of the compound is considered.

The medical advantages are the following:—(1) The compound never causes infiltrations and necrosis of the tissues and also no pain on injection. (2) The necessary dose of 0.6 gram of salvarsan can be administered in 1½ cubic centimeters, instead of in 6 cubic centimeters as heretofore. (3) The iodipin is completely absorbed. (4) The salvarsan is not deposited in the muscles, but is distributed uniformly throughout the body mass and is completely absorbed. (5) The iodipin slowly gives off iodin and thereby aids the action of the salvarsan. The latter need not be neutralized, since the iodipin has the action of an alkali iodin, the detached iodin combining with the alkalis of the tissue juice. This also would account for the complete emulsion of the preparation in the animal body. (6) An extraordinarily effective iodic arsenid is formed in the body by the detachment of the iodin. Since this setting-free goes on continuously, though rather slowly, it is believed, and numerous experiments and tests have strengthened this belief, that injurious effects following the use of such arsenic compounds are not to be feared, on account of which these otherwise highly efficacious compounds so far have not been introduced into therapeutics.

In preparing the new compound, by way of example, 4 grams of salvarsan are saturated in an agate bowl with about 15 drops of ethyl ether and then well ground and triturated, so that after evaporation of the ether an absolutely homogeneous fine-grained powder results. This mass, which at first was rather voluminous, coarse grained and difficult to grind, by this treatment with ether is greatly compacted and its fine grain now readily forms with relatively small amounts of oil an unguentous body in which a high percentage of the mass is contained as active constituent. The ether in no wise alters or affects the powder, while alcohol would at once render it lumpy. This pre-treatment with ether, therefore, forms an essential part of the process. The powder obtained in this manner is now heaped up in the middle of the bowl, so that no particles remain adhering to the walls, and a heated mixture of 5 cubic centimeters of a 25% iodipin, 1 cubic centimeter of a 10% iodipin, and 0.5 cubic centimeter of anhydrous lanolin is added. This is done by letting a few drops of the oil fall from above onto the powder heap and then pouring the rest from the side against the powder so that the entire mass is surrounded by an oil ring, for the purpose of preventing any of the powder from being miscarried. The bowl is then placed in the water bath and the powder is carefully triturated within the oil ring by means of a sterilized, slender and pointed glass rod or a pestle into a homogeneous, unctuous mass, which upon continued manipulation finally assumes uniform, liquid state. This liquid oil emulsion is then airtightly inclosed in small sterile flasks or tubes, which may also be evacuated, and in which the emulsion then congeals to the consistency of a salve or a solid fat.

For use the container is dipped for a few seconds into hot water or swiftly drawn through a Bunsen flame, when complete liquefaction takes place, without the homogeneity of the emulsion being interfered with. The oil is then aspirated from the opened flask with a suitable syringe and injected in well known manner.

What I claim is:—

As a new compound, an emulsion of dioxydiaminoarsenobenzene with iodized sesame oil.

In testimony whereof I affix my signature in presence of two witnesses.

CARL SCHINDLER.

Witnesses:
FELIX LUTZE,
WERNER LUTZE.